United States Patent

[11] 3,590,285

[72] Inventor Atwood H. Hargrove
Baltimore, Md.
[21] Appl. No. 805,054
[22] Filed Mar. 6, 1969
[45] Patented June 29, 1971
[73] Assignee The Bendix Corporation

[54] VOLTAGE CONTROLLED PHASE SHIFT NETWORK
4 Claims, 1 Drawing Fig.

[52] U.S. Cl. .......... 307/295, 307/253, 307/262
[51] Int. Cl. .......... H03k 17/00
[50] Field of Search .......... 328/57, 118; 307/232, 236, 262, 295, 273; 331/135

[56] References Cited

UNITED STATES PATENTS

| | | | |
|---|---|---|---|
| 3,201,700 | 8/1965 | Pasquier et al. .......... | 307/295 X |
| 3,454,904 | 7/1967 | Clites et al. .......... | 331/135 |
| 3,492,593 | 1/1970 | Ullmann et al. .......... | 307/273 |

*Primary Examiner*—Donald D. Forrer
*Assistant Examiner*—B. P. Davis
*Attorneys*—Plante, Arens, Hartz, Hix and Smith, Bruce L. Lamb, William G. Christoforo and Lester L. Hallacher

ABSTRACT: A circuit for selectively reversing an input signal by 180° is described. The input signal, which can be a pulse train or a continuously varying signal is applied to an input terminal. A control voltage is applied to a control terminal. When the control voltage is zero the input signal is amplified but does not undergo a phase shift. When a positive voltage is applied to the control terminal the input signal is amplified and also undergoes a 180° phase shift. The phase of the output signal can therefore be varied by switching the control voltage on and off.

PATENTED JUN 29 1971 3,590,285
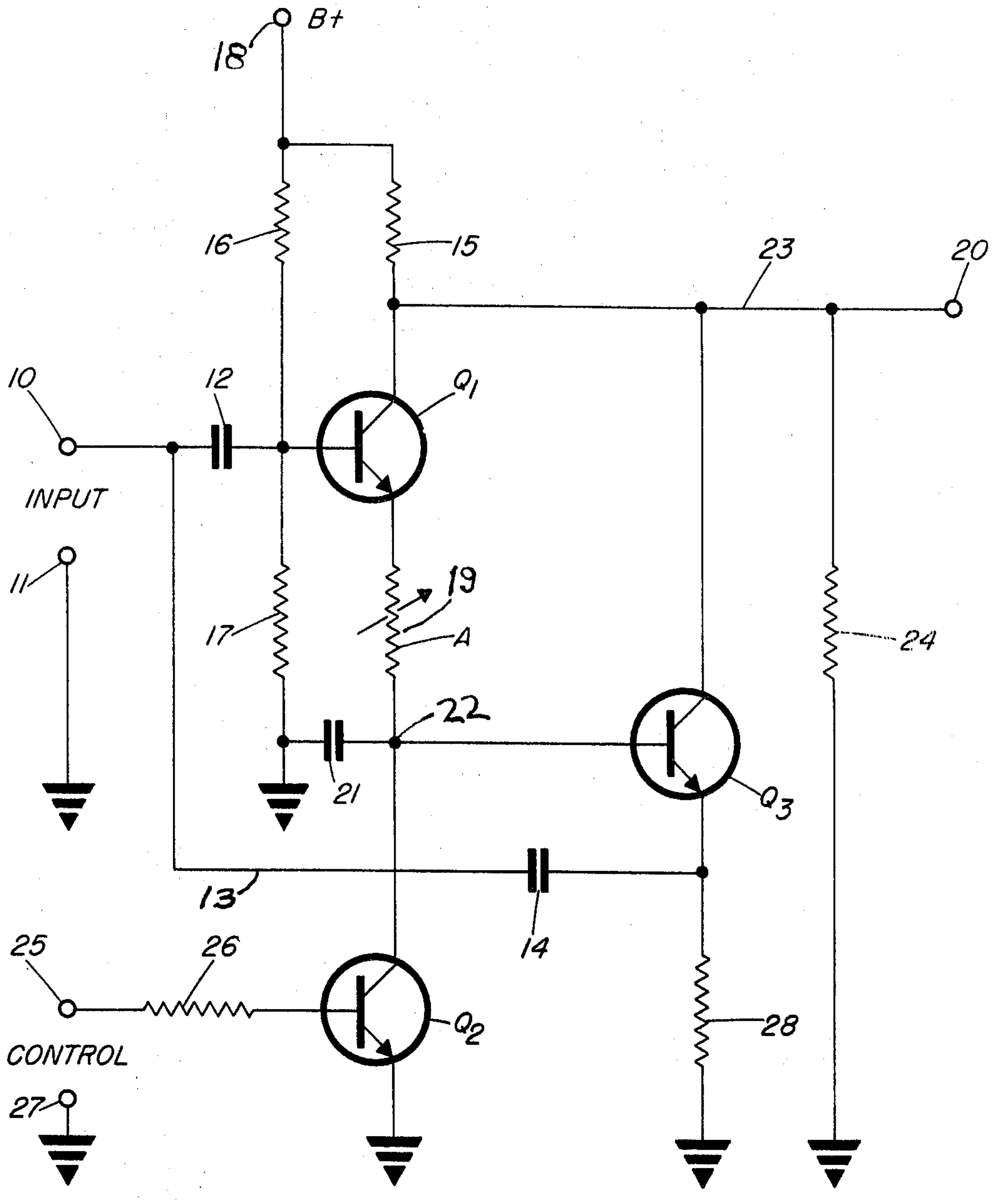
ATWOOD H. HARGROVE
INVENTOR
BY Peter L. Hallacher
ATTORNEY

VOLTAGE CONTROLLED PHASE SHIFT NETWORK

This invention relates to a phase reversing circuit. Accordingly it can also be considered as a phase switching circuit. In many types of electronic equipment it is necessary to change a phase of an input signal by 180°. The input signal may be either digital or a continuous radiofrequency signal. A digital system frequently utilizes inverting circuits to change the polarity of pulses before injecting them into a logic circuit. A radiofrequency signal may require a 180° phase shift so that it can be compared with another signal of known phase. Alternatively, the ability to rapidly reverse the phase of a signal by 180° may be very useful in determining the initial phase of the signal.

Because the instances where a 180° phase shift is required are numerous, many systems have been developed for accomplishing this purpose. Generally, the existing systems can be divided into two categories. The first category is mechanical switching systems. In these systems the mechanical switch is used to direct the incoming signal to a circuit which yields an output of the desired phase. The mechanical switch therefore merely directs the incoming signals to the desired processing circuitry. The second type of system is the solid state switching system. Frequently these systems employ a bridge circuit or a one-wire input and a one-wire output.

Although mechanical and solid-state systems have had limited success they nevertheless suffer inherent disadvantages. For example, mechanical switching systems suffer substantial contact wear thereby requiring frequent maintenance and repair or replacement. Also they are slow to operate and are frequently unduly noisy. Solid-state systems utilizing bridge circuits require very accurate biasing voltages and closely matched components. Single wire systems ordinarily are useful only in reversing one polarity of input. The invention is directed to a circuit which overcomes these difficulties in a simple and inexpensive manner.

Briefly, the inventive circuit consists of two amplifiers, both of which will amplify either polarity of input, irrespective of whether it is a digital input or a continuous input. The circuit also includes an output phase control device. When the control device is actuated one of the amplifiers is conductive while the other is not. When the control device is unactuated the amplifiers assume opposite states. One of the amplifiers reverses the incoming signal by 180° which the other does not. Consequently, the phase of the output can be varied 180° simply by changing the control voltage between two states, irrespective of the phase of the incoming signal.

It is therefore an object of this invention to provide a circuit for changing the phase of the input signal by either 0° or 180°.

It is another object to provide such a circuit which includes a control device so that the application and removal of a control signal effects the desired phase change.

It is another object of this invention to provide such a circuit which is operative for both polarities of input signal.

It is another object of this invention to provide such a circuit which is operative for both digital and continuous wave input signals.

Further objects, features and advantages of the invention will become apparent from the following description and claims when read in view of the accompanying drawings, wherein like numbers indicate like parts and in which:

The FIGURE shows a preferred embodiment of the instant invention.

As shown in the figure, the input signal is applied to the circuit across input terminals 10 and 11. The input signal can be either a continuous wave such as a radiofrequency signal or a pulse train of any polarity or varied polarity. The input signal is applied to the base of transistor $Q_1$ through a coupling capacitor 12. The incoming signal is also applied to the emitter of a transistor $Q_3$ by line 13 through a coupling capacitor 14. Transistor $Q_1$ is connected to serve as an amplifier and therefore has the usual biasing resistors 15, 16 and 17. A B+ biasing potential is applied to the biasing terminal 18. The emitter of transistor $Q_1$ is connected to the base of transistor $Q_3$ through a potentiometer 19. Potentiometer 19 is used to balance the gain of transistors $Q_1$ and $Q_3$ so that the output level present at output terminal 20 is substantially the same irrespective of which of the two transistors is conducting. A capacitor 21 is connected between the junction 22 of potentiometer 19 and the base of transistor $Q_3$ and ground. This capacitor holds a low positive voltage on the base of transistor $Q_3$ when transistor $Q_3$ is almost cut off, thereby maintaining transistor $Q_3$ in a conductive state at this time.

The collectors of transistors $Q_1$ and $Q_3$ are both connected to line 23 so that the output signal applied to output terminal 20 is taken from load resistor 24 irrespective of which of the two transistors is conducting. The collector-emitter junction of a transistor $Q_2$ is connected between junction 22 and ground. The base of transistor $Q_2$ is connected to a control terminal 25 through a resistor 26. A control voltage is therefore applied to the base of transistor $Q_2$ across control terminals 25 and 27. The emitter of transistor $Q_3$ is held above ground level by a resistor 28.

The operation of the circuit can be best understood by first assuming that an input voltage is applied to input terminal 10 and that the control terminal 25 is at zero potential. In this condition the collector current of transistor $Q_2$ is very near to zero. The current flow through the collector-emitter junction of transistor $Q_1$ is controlled by transistor $Q_2$ and therefore transistor $Q_1$ is essentially cut off. However, a small current flows through the collector-emitter junction. This current charges capacitor 21 thereby applying a positive potential to the base of transistor $Q_3$. Transistor $Q_3$ is therefore conducting and the incoming signal present on input terminal 10 is amplified by transistor $Q_3$. The amplified signal is applied to load resistor 24 and is the same phase as the incoming signal.

If a positive voltage is applied to control terminal 25 transistor $Q_2$ becomes saturated. The saturation of transistor $Q_2$ causes the base of transistor $Q_3$ to go to zero. This causes transistor $Q_3$ to cut off and simultaneously causes transistor $Q_1$ to conduct. In this condition the incoming signal present on input terminal 10 is amplified by transistor $Q_1$. Accordingly, the output signal applied to load resistor 24 is phase shifted by 180° with respect to the incoming signal.

Potentiometer 19 which is connected between the emitter of transistor $Q_1$ and junction 22 is used to control the current flow through this junction and therefore can be used to adjust the gain of the two transistors $Q_1$ and $Q_3$ so that the signal level present on load resistor 24 is essentially the same irrespective of which of the two transistors is conducting. Because the circuit is operative for either polarity of input signals and for continuous signals as well as pulse signals, the circuit is very versatile. For example, the circuit has been tested for satisfactory operation with an RF input signal from 5 kHz. to 10 MHz. The circuit can also be used to transform a bipolar pulse train into a unipolar pulse train simply by feeding a synchronous signal onto control terminal 25. In this manner the pulses of one polarity can be reversed to those of the other polarity resulting in a unipolar pulse train. Alternatively, a unipolar pulse train can be converted into a bipolar pulse train simply by controlling the control input to terminal 25 in the proper manner. The inventive circuit is quite advantageous, not only because of its versatility, but also because of its simplicity, high gain, wide bandwidth response and its adaptability to microcircuit techniques.

Although this invention has been described with respect to a particular embodiment thereof, it is not to be so limited, as changes and modifications may be made therein which are within the spirit and scope of the invention as defined by the appended claims.

The invention I claim is:

1. A voltage controlled phase shift network comprising:

a first transistor having a first base electrode, first emitter electrode and first collector electrode;

an output terminal;

a second transistor having a second base electrode, second emitter electrode and second collector electrode, said first and second collector electrodes being connected in common to said output terminal;

a DC voltage source having first and second terminals;

first means for connecting said first base electrode to said first terminal;

second means for connecting said second emitter electrode to said second terminal;

third means for connecting said first emitter electrode with said second base electrode;

an input terminal;

means for connecting said input terminal to said first base electrode;

means for connecting said input terminal to said second emitter electrode;

means for directly shunting said second base electrode to said second terminal when energized;

means for selectively energizing said shunting means; and, a common load connected between said first terminal and said common collector electrodes.

2. The phase shift network of claim 1 wherein said shunting means is a third transistor having an emitter-collector circuit connected between said second base electrode and said second terminal, and a base electrode connected to said selectively energizing means.

3. The phase shift network of claim 2 wherein said first, second and third means are first, second and third resistors respectively.

4. The phase shift network of claim 3 wherein said third resistor is variable.